US010590607B2

(12) United States Patent
Carceller et al.

(10) Patent No.: US 10,590,607 B2
(45) Date of Patent: Mar. 17, 2020

(54) METHOD FOR PRODUCING INTERPENETRATING POLYMER NETWORK MATERIAL, A PRODUCT THEREOF AND USE OF THE PRODUCT

(71) Applicant: Kemira Oyj, Helsinki (FI)

(72) Inventors: Rosa Carceller, Espoo (FI); Tom Lundin, Turku (FI); Matti Hietaniemi, Espoo (FI)

(73) Assignee: Kemira Oyj, Helsinki (FI)

( * ) Notice: Subject to any disclaimer, the term of this patent is extended or adjusted under 35 U.S.C. 154(b) by 37 days.

(21) Appl. No.: 15/538,649

(22) PCT Filed: Dec. 3, 2015

(86) PCT No.: PCT/FI2015/050849
§ 371 (c)(1),
(2) Date: Jun. 21, 2017

(87) PCT Pub. No.: WO2016/102753
PCT Pub. Date: Jun. 30, 2016

(65) Prior Publication Data
US 2018/0023253 A1    Jan. 25, 2018

(30) Foreign Application Priority Data

Dec. 22, 2014   (FI) ...................................... 20146134

(51) Int. Cl.
| D21H 21/10 | (2006.01) |
| D21H 11/18 | (2006.01) |
| D21H 17/25 | (2006.01) |
| D21H 21/20 | (2006.01) |
| C08L 33/26 | (2006.01) |
| C08F 220/56 | (2006.01) |
| D21H 21/18 | (2006.01) |

(52) U.S. Cl.
CPC .......... *D21H 21/10* (2013.01); *C08F 220/56* (2013.01); *C08L 33/26* (2013.01); *D21H 11/18* (2013.01); *D21H 17/25* (2013.01); *D21H 21/18* (2013.01); *D21H 21/20* (2013.01); *C08G 2270/00* (2013.01); *C08L 2205/04* (2013.01)

(58) Field of Classification Search
CPC ................................................. C08G 2270/00
See application file for complete search history.

(56) References Cited

U.S. PATENT DOCUMENTS

| 5,059,654 | A | * | 10/1991 | Hou ................. A61K 39/39525 |
| | | | | 210/198.2 |
| 8,647,470 | B2 | | 2/2014 | Esser |
| 9,783,930 | B2 | * | 10/2017 | Luna Marroquin ... D21H 17/11 |
| 2001/0038831 | A1 | | 11/2001 | Park |
| 2003/0232895 | A1 | | 12/2003 | Omidian |
| 2004/0242770 | A1 | * | 12/2004 | Feldstein ............. A61K 8/0208 |
| | | | | 525/54.3 |
| 2009/0162640 | A1 | * | 6/2009 | Schlenoff ................ A61L 27/14 |
| | | | | 428/323 |
| 2011/0182990 | A1 | * | 7/2011 | Su ......................... A61L 15/225 |
| | | | | 424/484 |
| 2012/0045651 | A1 | * | 2/2012 | Myung .................... A61K 6/09 |
| | | | | 428/423.1 |
| 2012/0205065 | A1 | | 8/2012 | Esser |
| 2013/0029105 | A1 | * | 1/2013 | Miller .................... D21H 21/18 |
| | | | | 428/172 |
| 2013/0261208 | A1 | | 10/2013 | Borges De Couraca |
| 2017/0268176 | A1 | * | 9/2017 | Hietaniemi .......... D21H 17/375 |
| 2018/0194906 | A1 | * | 7/2018 | Carceller .............. C08F 271/00 |

FOREIGN PATENT DOCUMENTS

| CN | 102245218 A | 11/2011 |
| CN | 102959018 A | 3/2013 |
| CN | 103435951 A | 12/2013 |
| CN | 103665439 A | 3/2014 |
| JP | 2009067817 A | 4/2009 |
| JP | 2012092203 A | 5/2012 |
| JP | 2014187901 A | 10/2014 |
| WO | 2011048000 A1 | 4/2011 |
| WO | 2014127470 A1 | 8/2014 |
| WO | 2014154937 A1 | 10/2014 |
| WO | 2015020962 A1 | 2/2015 |

OTHER PUBLICATIONS

Taipale (Interactions of Microfibrillated Cellulose and Cellulosic Fines With Cationic Polyelectrolytes, 2010) (Year: 2010).*
State Intellectual Property Office, P.R. China, first office action issued for CN 201580070407.4, dated Jul. 13, 2018.
Search report of Finnish Patent application No. 20146134, Finnish Patent Office, dated Aug. 13, 2015.
Hebeish, A et al. Thermal responsive hydrogels based on semi interpenetrating network of poly(NIPAm) and cellulose nanowhiskers, Carbohydrate Polymers, vol. 102, 2014, 159-166, Chapter 2.3 (p. 160) and Chapter 3 (p. 161).
Chang Structure and properties of cellulose/poly(N-isopropylacrylamide) hydrogels prepared by IPN strategy, Polymers Advance Tehnologies, Published Dec. 13, 2009.

* cited by examiner

*Primary Examiner* — Liam J Heincer
(74) *Attorney, Agent, or Firm* — Berggren LLP

(57) ABSTRACT

The present invention relates to an interpenetrating polymer network (IPN) material comprising microcrystalline cellulose (MCC), microfib-rillated cellulose (MFC) or a mixture thereof, and at least one polymer forming an IPN together with the MCC, MFC or mixture thereof. The present invention further relates to a process for producing the IPN material, and to use of the IPN material in paper industry.

17 Claims, 1 Drawing Sheet

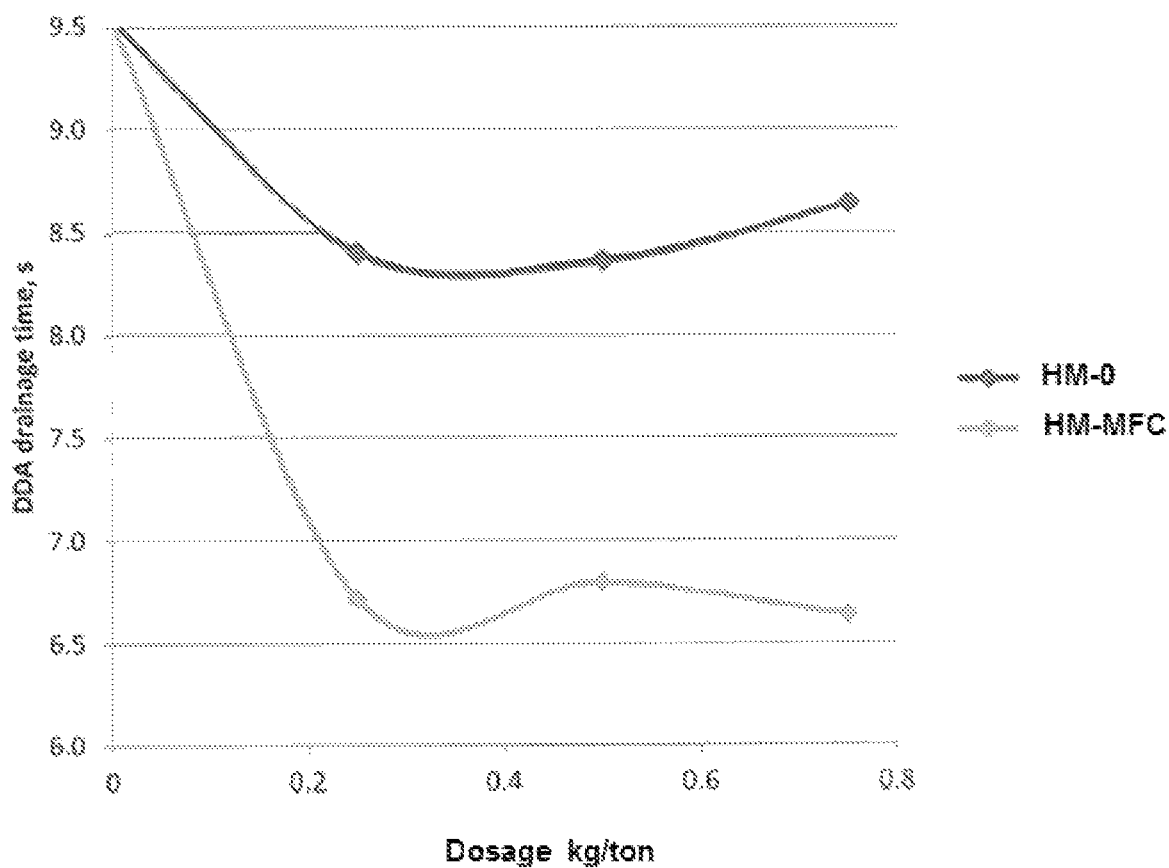

METHOD FOR PRODUCING INTERPENETRATING POLYMER NETWORK MATERIAL, A PRODUCT THEREOF AND USE OF THE PRODUCT

PRIORITY

This application is a U.S national application of PCT-application PCT/FI2015/050849 filed on Dec. 3, 2015 and claiming priority of Finnish national application FI20146134 filed on Dec. 22, 2014, the contents of all of which are incorporated herein by reference.

FIELD OF THE INVENTION

The present invention relates to a process for producing an interpenetrating polymer network material and a product thereof. The present invention further relates to use of the interpenetrating polymer network material in paper industry.

BACKGROUND ART

Paper industry continuously strives to improve paper and paperboard quality, increase process speeds, reduce manufacturing costs etc. Various chemicals, synthetic and naturally occurring, are used to treat pulp in order to improve, for example, retention and drainage, and to create physical properties such as wet and dry strength of the final paper product.

A retention agent is a process chemical that improves retention of a functional chemical in a substrate. The result is that totally fewer chemicals are used to get the same effect of the functional chemical and fewer chemicals goes to waste.

Drainage additives are materials that increase drainage rate of water from pulp slurry on a wire. Common drainage additives are cationic starch and polyacrylamide.

Wet strength additives ensure that when paper becomes wet, it retains its strength. This is especially important in a tissue paper. Examples of wet strength additives are urea-formaldehyde (UF), melamine-formaldehyde (MF) and polyamide-epichlorohydrin (PEA).

Dry strength additives are chemicals that improve paper strength of normal or not wet condition. Typical chemicals used are starch and polyacrylamide (PAM) derivatives. The starch and PAM derivatives may be anionically or cationically charged. By using cationic starch or PAM, negatively charged fibers can bind with the cationic starch or PAM and thus increase inter-connections between the fibers, and thus strength.

For example, U.S. Pat. No. 8,647,470 discloses a method for producing paper, paperboard and cardboard having improved dry strength. The improved dry strength is obtained by adding into a stock an aqueous blend comprising nanocellulose and at least one polymer selected from the group consisting of the anionic polymers and water-soluble cationic polymers, draining of the paper stock and drying of the paper products.

An Interpenetrating Polymer Network (IPN) is a polymer, also referred to as IPN material, comprising two or more networks which are at least partially interlaced on a molecular scale, but not covalently bonded to each other. The network cannot be separated unless chemical bonds are broken. The two or more networks can be envisioned to be entangled in such a way that they are concatenated and cannot be pulled apart, but not bonded to each other by any chemical bond.

In other words, the interpenetrating polymer networks are a combination of at least two polymers, wherein at least one of the polymers is synthesized (polymerized) and/or cross-linked in the immediate presence of the other(s).

Simply mixing two or more polymers does not create an interpenetrating polymer network (but a polymer blend), nor does creating a polymer network out of at least one kind of monomer(s) which are bonded to each other to form one network (heteropolymer or copolymer).

Document Chang et al., Polymers for Advanced Technologies (2011), 22(9), 1329-1334, discloses structure and properties of cellulose/poly(N-iso-propylacrylamide) double network hydrogels prepared by IPN method. The cellulose hydrogel are prepared by chemically crosslinking cellulose in NaOH/urea aqueous solution, which is employed as first network. Second network is subsequently obtained by in situ polymerizing/crosslinking of N-iso-propylacrylamide in the cellulose hydrogel. The method creates double network hydrogel, which combines natural polymer and synthesized poly(N-isopropylacrylamide collectively in one system.

Even though there is available cellulose containing IPNs, there is still a need for novel cellulose containing IPN materials to be used as additives in production of paper and paperboard having improved properties.

SUMMARY OF THE INVENTION

The present invention relates to a process for producing interpenetrating polymer network material according to claim 1.

The present invention also relates to interpenetrating polymer network material according to claim 8.

Additionally, the present invention also relates to use of the interpenetrating polymer network material according to claim 14.

The inventors have surprisingly found that an interpenetrating polymer network material comprising microcrystalline cellulose (MCC), microfibrillated cellulose (MFC) or a mixture thereof and at least one polymer forming the interpenetrating polymer network together with the MCC, MFC or mixture thereof can be used as an additive in paper industry for increasing process speed and improving quality of final products. For example, the IPN material of the present invention improves drainage time significantly compared to cationic polyacrylamide (cPAM).

The interpenetrating polymer network (IPN) material has as an advantage that the IPN material has properties of all of the components (MCC/MFC and the other polymer(s)). In addition, the IPN material is easily produced with the method of the present invention.

The IPN material is used in paper industry as an additive. Since the IPN material of the present invention contains cellulose material (MFC/MCC), the IPN material has better adhesion, absorption etc. to cellulose than a synthetic polymer alone. The IPN material has the properties of both the MCC/MFC and the other polymer(s).

BRIEF DESCRIPTION OF FIGURES

FIG. 1 presents drainage time with the IPN material (HM-MFC) of the present invention compared to cationic polyacrylamide (HM-0).

DETAILED DESCRIPTION

By term "interpenetrating polymer network (IPN) material" is meant a combination of MCC, MFC or mixture thereof and at least one polymer, wherein the at least one polymer is synthesized (polymerized) or cross-linked or synthesized and cross-linked in the immediate presence of the MCC, MFC or mixture thereof (in situ).

By term "at least one polymer" is meant one, two, three, or more other type(s) of polymer(s) than MCC or MFC.

By term "at least one monomer" is meant single type monomer, two different types of monomers, three different types of monomers, or more different types of monomers. In other words, the monomer can be of one type, or the monomers can be of two or more different types. Polymerization of single type monomer produces homopolymer. Polymerization of two or more different types of monomers produces copolymer(s).

In one aspect of the present invention there is provided a process for producing an interpenetrating polymer network (IPN) material.

More particularly there is provided a process for producing an interpenetrating polymer network (IPN) material comprising
 i) providing an aqueous solution comprising microcrystalline cellulose (MCC), microfibrillated cellulose (MFC) or a mixture thereof and at least one monomer;
 ii) polymerizing in situ the at least one monomer to form IPN together with the MCC, MFC or mixture thereof; and
 iii) obtaining the IPN material.

In step i) is provided an aqueous solution comprising microcrystalline cellulose (MCC), microfibrillated cellulose (MFC) or a mixture thereof and at least one monomer.

Microfibrillated cellulose (MFC) may also be called nanofibrillar cellulose (NFC), nanocellulose, nanofibrillated cellulose, cellulose nanofiber, nano-scale fibrillated cellulose, microfibrillar cellulose, cellulose nanofibrils (CNF) or any wood based fibrillated fibers (SR>75). The MFC fibrils are isolated from the wood-based fibers and the width and length of the MFC fibers vary depending on the specific manufacturing process. A typical width of MFC is from about 3 nm to about 3 µm, preferably from about 3 to about 300 nm, such as from about 3 to about 100 nm, from about 10 to about 300 nm, from about 10 to about 100 nm, or from about 100 to about 300 nm; and a typical length is from about 100 nm to about 700 µm, preferably from about 100 nm to about 200 µm, such as from about 100 nm to about 50 µm, from about 200 nm to about 40 µm, from about 400 nm to about 30 µm, from about 500 nm to about 20 µm, from about 500 nm to about 10 µm, from about 500 nm to about 100 µm, or about 1-50 µm.

Microcrystalline cellulose (MCC), may also be called cellulose microcrystal (CMC), is a type of cellulose nanostructured material that is typically approximately 10-15 µm in diameter, contains a degree of crystallinity, and is composed of aggregated bundles of cellulose. MCC is typically manufactured by partially depolymerizing high purity cellulose, has typically a degree of polymerization typically less than 400, is typically composed of particles where not more than 10% of which have diameters below 5 µm and usually has an aspect ratio less than 2.

The MFC and MCC can be produced with known methods. Additionally, MCC and MFC are commercially available.

MFC and MCC may also be modified, for example, by introducing anionic charges or cationic charges to the MFC and MCC.

The aqueous solution may be obtained by mixing MCC, MFC or a mixture thereof in water together with the at least one monomer.

In one embodiment the MCC, MFC or mixture thereof is first mixed with water, followed by addition of the at least one monomer and mixing the formed mixture.

In other embodiment, first the at least one monomer is mixed with water, followed by addition of the MCC, MFC or mixture thereof and mixing the formed mixture.

Yet in other embodiment the MCC, MFC or mixture thereof is mixed with water, and the at least one monomer is mixed separately with water, and the two mixtures are combined to obtain the aqueous solution comprising MCC, MFC or a mixture thereof and at least one monomer.

The mixing method can be any suitable mixing method, such as magnetic stirrer.

The mixing may be performed also at elevated temperature. In one embodiment the MCC, MFC or mixture thereof is mixed with water, for example for a period of 30 min, at elevated temperature such as 95° C. until the solution is translucent. And followed by addition of the at least one monomer.

The at least one monomer may be any suitable monomer(s) that can be polymerized in an aqueous solution.

Examples of suitable monomers are acrylamide, N-methylolacrylamide, N-methylol(meth)acrylamide, N,N-dimethylaminopropyl acrylamide, N,N-dimethylaminopropylacrylamide, N,N-dimethylaminopropylmethacrylamide, N,N-dimethylaminoethylacrylamide and N-[2-(dimethylamino)-1,1-dimethylethyl]-acrylamide.

The monomer may also be cationic or anionic monomer.

Examples of suitable cationic monomers are 2-(acryloyloxy)ethyl]trimethyl-ammonium chloride, (3-acrylamidopropyl)trimethyl ammonium chloride, 2-(diethylamino)ethyl acrylate, 2-(dimethylamino)ethyl acrylate, [2-(methacrylo-yloxy)ethyl]-trimethylammonium chloride and [3-(methacryloylamino)propyl]trimethylammonium chloride.

Examples of suitable anionic monomers are acrylic acid, acryloyl chloride, methacrylic acid, 2-acrylamido-2-methylpropane sulfonic acid and sodium 2-(acryloylamino)2-methyl-1-propanesulfonate.

Preferably the at least one monomer is selected from a group consisting of acrylamide, N-methylolacrylamide, N-methylol(meth)acrylamide, N,N-dimethyl-aminopropyl acrylamide, N,N-dimethylaminopropylacrylamide, N,N-dimethyl-aminopropylmethacrylamide, N,N-dimethylaminoethylacrylamide, N-[2-(dimethylamino)-1,1-dimethylethyl] acrylamide, cationic monomers selected from a group consisting of 2-(acryloyloxy)ethyl]trimethylammonium chloride, (3-acrylamidopropyl)trimethyl ammonium chloride, 2-(diethylamino)ethyl acrylate, 2-(dimethylamino)ethyl acrylate, [2-(methacryloyloxy)ethyl]-trimethylammonium chloride, [3-(methacryoyl-amino)propyl]trimethylammonium chloride, anionic monomers selected from a group consisting of acrylic acid, acryloyl chloride, methacrylic acid, 2-acrylamido-2-methylpropane sulfonic acid, sodium 2-(acryloylamino)2-methyl-1-propanesulfonate, or mixtures thereof.

In one embodiment the monomer(s) are acrylamide and cationic or anionic monomer, preferably acrylamide and cationic monomer selected from a group consisting of 2-(acryloyloxy)ethyltrimethylammonium chloride, (3-acrylamidopropyl)trimethyl ammonium chloride, [2-(methacryloyloxy)ethyl]-trimethyl-ammonium chloride, [3-(methacryoylamino)propyl]trimethylammonium chloride.

In one preferred embodiment the at least one monomer is selected from acrylamide, [2-(acryloyloxy)ethyl]-trimethyl ammonium chloride or a mixture thereof. Preferably the at least one monomer is/are acrylamide and [2-(acryloyloxy)ethyl]-trimethyl ammonium chloride.

Optionally, an acid, such as adipic acid, or a base can be added to the aqueous solution for controlling pH of the solution. The pH is preferably set to acidic region, more preferably to value of 2-4 such as 3.

In step ii) the at least one monomer is polymerized to form IPN together with the MCC, MFC or mixture thereof.

The at least one monomer is polymerized in the aqueous solution in the presence of the MCC, MFC or mixture thereof to form the IPN material. That is to say, the at least one monomer is polymerized in situ.

The formed polymer can be homopolymer or copolymer, depending on the monomers.

In one embodiment the formed polymer is cross-linked in situ to form cross-linked IPN together with the MCC, MFC or mixture thereof.

In one embodiment after the polymerization forming the IPN with the MCC, MFC or mixture thereof, at least one additional monomer is added to the solution containing the formed IPN material, and polymerized in situ to form double IPN material.

The polymerization of step ii) may be initiated with one or more suitable initiators. Preferably the initiator is selected from a group consisting of 2,2'-azobis(2-methylpropionamidine) dihydrochloride, 2,2'-azobis[2-(2-imidazolin-2-yl)propane]dihydrochloride, 2,2'-azobisisobutyronitrile (AIBN), peroxides, per-acids, persulfates such as potassium persulfate and ammonium persulfate, sulfates, sulfites or mixtures thereof, preferably ammonium persulfate.

The step ii) may be performed under an inert atmosphere, preferably under $N_2$ atmosphere. The step ii) may also be performed in lowered or raised temperature, or as an adiabatic reaction.

In step iii) the IPN material is obtained. The obtained IPN material is optionally dried with any conventional method such as oven. The dried IPN material can be optionally milled to obtain the IPN material in powder form. In a preferred embodiment dried IPN material is milled.

Amount of the MCC, MFC or a mixture thereof in the solution can be chosen depending on wanted properties of the IPN material. In one embodiment the amount of the MCC, MFC or a mixture thereof is 0.5-15 wt. %, preferably 1-10 wt. %, more preferably 1-5 wt. %, and even more preferably 1-3 wt. % such as 1.6 wt. % based on the amount of the IPN material.

In a preferred embodiment, the process for producing the interpenetrating polymer network (IPN) material comprises mixing MCC or MFC at a temperature of 80-100° C., such as 95° C., for 15-60 min, such as 30 min, in water, preferably until the solution is translucent. Optionally the MCC or MFC aqueous solution is cooled. At least one monomer, such as two monomers (for example a solution of acrylamide and [2-(acryloyloxy)ethyl]trimethyl ammonium chloride), are added to the aqueous solution and stirred. Optionally an acid, such as adipic acid, is added after the monomers to set pH of the solution to acidic region, such as 2-4. Optionally reaction vessel is sealed and polymerization is conducted under inert atmosphere, such as $N_2$ atmosphere. Preferably, initiator(s), such as ammonium persulfate is added. Formed IPN material is obtained, and optionally dried and milled to produce IPN material in powder form. The polymerization reaction may take place for 15 minutes to 5 hours, such as 3 hours.

In second aspect of the present invention there is provided an interpenetrating polymer network (IPN) material.

The interpenetrating polymer network (IPN) material is a combination of MCC, MFC or mixture thereof and at least one polymer, wherein the at least one polymer is synthesized (polymerized) or cross-linked or synthesized and cross-linked in the immediate presence of the MCC, MFC or mixture thereof (in situ).

More particularly there is provided an interpenetrating polymer network (IPN) material comprising microcrystalline cellulose (MCC), microfibrillated cellulose (MFC) or a mixture thereof; and at least one polymer forming the IPN together with the MCC, MFC or a mixture thereof.

Microfibrillated cellulose (MFC) may also be called nanofibrillar cellulose (NFC), nanocellulose, nanofibrillated cellulose, cellulose nanofiber, nano-scale fibrillated cellulose, microfibrillar cellulose, cellulose nanofibrils (CNF) or any wood based fibrillated fibers (SR>75). The MFC fibrils are isolated from the wood-based fibers and the width and length of the MFC fibers vary depending on the specific manufacturing process. A typical width of MFC is from about 3 nm to about 3 μm, preferably from about 3 to about 300 nm, such as from about 3 to about 100 nm, from about 10 to about 300 nm, from about 10 to about 100 nm, or from about 100 to about 300 nm; and a typical length is from about 100 nm to about 700 μm, preferably from about 100 nm to about 200 μm, such as from about 100 nm to about 50 μm, from about 200 nm to about 40 μm, from about 400 nm to about 30 μm, from about 500 nm to about 20 μm, from about 500 nm to about 10 μm, from about 500 nm to about 100 μm, or about 1-50 μm.

Microcrystalline cellulose (MCC), may also be called cellulose microcrystal (CMC), is a type of cellulose nanostructured material that is typically approximately 10-15 μm in diameter, contains a degree of crystallinity, and is composed of aggregated bundles of cellulose. MCC is typically manufactured by partially depolymerizing high purity cellulose, has typically a degree of polymerization typically less than 400, is typically composed of particles where not more than 10% of which have diameters below 5 μm and usually has an aspect ratio less than 2.

MFC and MCC may also be modified, for example, by introduction of anionic charges or cationic charges to the MFC and MCC.

The MCC and MFC can be produced with known methods. Additionally, MCC and MFC are commercially available.

The at least one polymer may be any suitable polymer(s). The polymer may be homopolymer or copolymer. The polymer may be anionic or cationic, preferably cationic.

Examples of suitable homopolymer(s) are polyacrylamide, poly(meth)acrylamide, poly(N-methylolacrylamide), poly(N-methylol(meth)acrylamide), poly(N,N-dimethylaminopropyl acrylamide), poly(N,N-dimethylaminopropylacrylamide), poly(N,N-dimethylaminopropylmethacrylamide), poly(N,N-dimethylamino-ethylacrylamide), poly(N-[2-(dimethylamino)-1,1-dimethylethyl]-acrylamide), or mixtures thereof.

In one embodiment the at least one polymer is a polymer or copolymer that is formed in a polymerization reaction of at least one monomer selected from a group consisting of acrylamide, N-methylolacrylamide, N-methylol(meth)acrylamide, N,N-dimethylaminopropyl acrylamide, N,N-dimethylaminopropylacrylamide, N,N-dimethylaminopropylmethacrylamide, N,N-dimethylaminoethylacrylamide, N-[2-(dimethylamino)-1,1-dimethylethyl]acrylamide, cationic monomers selected from a group consisting of 2-(acryloyloxy)ethyl]trimethylammonium chloride, (3-acrylamidopropyl)trimethyl ammonium chloride, 2-(diethylamino)ethyl acrylate, 2-(dimethylamino)ethyl acrylate, [2-(methacryloyloxy)ethyl]-trimethylammonium chloride, [3-(methacryoylamino)propyl]trimethylammonium chloride, anionic monomers selected from a group consisting of acrylic acid, acryloyl chloride, methacrylic acid, 2-acrylamido-2-methylpropane sulfonic acid, sodium 2-(acryloylamino)2-methyl-1-propanesulfonate, or mixtures thereof.

In one embodiment the at least one polymer is a copolymer, preferably a co-polymer of acrylamide and cationic monomer selected from a group consisting of 2-(acryloyloxy)ethyl]trimethylammonium chloride, (3-acrylamidopropyl)trimethyl ammonium chloride, [2-(methacryloyloxy)ethyl]-trimethylammonium chloride, [3-(methacryoylamino)propyl]trimethylammonium chloride, and more preferably a copolymer of acrylamide and [2-(acryloyloxy)ethyl]-trimethyl ammonium chloride.

Salt viscosity of the IPN material at 18/6 spindle is preferably 100-60 cP, more preferably 95-65 cP.

In one embodiment charge density (meq/g (Mutek)) of the IPN material is 1.5-1.1 meq/g, preferably 1.45-1.15 meq/g at acidic pH; and 1.3-0.1 meq/g, preferably 1.2-0.2 at neutral pH. The charge densities are measured from 0.5 wt. % aqueous solution.

In a preferred embodiment the IPN material is in form of powder.

Amount of the MCC, MFC or a mixture thereof in the IPN material is 0.5-15 wt. %, preferably 1-10 wt. %, more preferably 1-5 wt. %, and even more preferably 1-3 wt. % such as 1.6 wt. % based on the amount of the IPN material.

The at least one polymer may optionally be cross-linked. When the polymer is cross-linked the IPN material comprises additionally the cross-linker. Any suitable cross-linking agent may be used.

The IPN material may comprise also initiator(s).

Preferably the IPN material is produced with the above described process.

In third aspect of the present invention there is provided use of the interpenetrating polymer network (IPN) material.

More particularly there is provided use of the interpenetrating polymer network (IPN) material in paper industry.

The interpenetrating polymer network (IPN) material described above or interpenetrating polymer network (IPN) material produced with the process described above may be used as drainage, dewatering, wet strength or dry strength additive in paper industry.

In one embodiment dosage of the IPN material as drainage additive is 0.1-1 kg/ton, preferably 0.2-0.8 kg/ton of dry pulp.

In fourth aspect of the present invention there is provided a method of producing paper or board, comprising the steps of providing a pulp slurry, adding the IPN material according to the present invention or the IPN material produced by the process according to the present invention to the pulp slurry, dewatering said pulp slurry on a wire, and forming a paper of said dewatered pulp slurry.

In fifth aspect of the present invention there is provided a method for improving drainage in production of paper or board, characterized by adding the IPN material according to the present invention or the IPN material produced by the process according to the present invention to a pulp slurry.

EXAMPLES

Preparation of IPN material of the Present Invention

Microcrystalline cellulose (MCC) 30% (96.27 g) from Kemira was cooked at 95° C. during 30 min in 300 g of water until the solution is translucent. Then the cellulose aqueous solution was cooled down and put in into a dewar 1 L flask. Monomers acrylamide 50% (448 g) from Kemira and [2-(acryloyloxy)ethyl]trimethyl ammonium chloride solution 80% (81 g) from Kemira were added into the flask and stirred. Adipic acid (14 g) was added after the monomers. The flask was sealed with cling film to maintain $N_2$ atmosphere and two degassing tubes with constant nitrogen flow were inserted. The solution was degassed for 1 h. Initiator (V-50 and ammonium persulfate) from Aldrich was added. The solution started to thicken. Bubbling of nitrogen was continued until gel was formed. The flask was left for 3 h. The formed gel was pulled out from the flask, and it was cut in pieces and feed into a mincer. The minced gel was left to dry. After the drying the dried gel was milled to produce the IPN material in powder form.

Preparation of Cationic Polyacrylamide, and Cationic Polyacrylamide/Microcrystalline Cellulose Blend (Comparative Examples)

Cationic polyacrylamide was made in the same way as the IPN material, but without MCC. That is, the cationic polyacrylamide was made in water, not in MCC aqueous dispersion. Obtained product was powder cationic polyacrylamide.

A portion of the prepared cationic polyacrylamide and solid MCC from Kemira were dissolved and dispersed in water under stirring (1 hour), using same amounts that were used when the IPN material was prepared with the above described procedure.

Characterization

Viscosities, insolubles and charges were measured from the prepared IPN material, cationic polyacrylamide and blend of polyacrylamide and microcrystalline cellulose samples.

Salt viscosity (cP) was measured using Brookfield LVTDV-II or LVTDV-I viscositymeter. 0.5 wt. % of sample in aqueous solution is made mixing the sample with deionized water with a magnetic stirrer for 60 min. NaCl (5 wt %) is added to the aqueous sample solution, and mixed for 5 minutes. 8 ml of the sample solution was poured into sample adapter at 25° C., and viscosity was measured using spindle 18 and 30 rpm.

Insolubles were measured using a stainless steel sieve with aperture 500 microns. The sieve was filled with the aqueous sample solution (made with the above method in salt viscosity measurement) and allowed to drain. The sieve was washed with 1000 ml of cold water. Total drainage time not to exceed 5 minutes. Gels and/or particles remaining on the sieve were visually counted.

For measuring charges, Mutek PCD 03 or PCD or Mettler DL25 was used. For cationic polymer titration, anionic polyelectrolyte, sodium polyetylenesulfonic acid, PES-Na was used. For anionic polymer titration, cationic polyelectrolyte, poly-diallyl-dimethyl ammonium chloride, pDADMAC was used.

Results

In Table 1 are compared properties of cationic polyacrylamide (sample HM-0), IPN material of the present invention (sample HM-MCC-10) and blend of polyacrylamide and microcrystalline cellulose (sample HM-0+MCC).

TABLE 1

| Sample | Salt viscosity, cP | | Insolubles | Charges meq/g (Mutek) | |
|---|---|---|---|---|---|
| | 18/6 | 18/30 | | pH = acid (2.5) | pH = neutral |
| HM-0 | 81 | 40 | 5 | 1.40 | 1.19 |
| HM-MCC-10 | 68.5 | 35.2 | 3 | 1.35 | 0.35 |
| HM-0 + MCC | 27 | 18.8 | 0 | 2.13 | 0.91 |

HM-0 is dry cationic polyacrylamide.
HM-MCC-10 is IPN material of the present invention made with the process of the present invention.
HM-0 + MCC, is a blend of HM-0 and MCC, in the same amounts as in HM-MCC-10.

As can be seen from Table 1, the IPN material (HM-MCC-10) of the present invention has different properties than the cationic polyacrylamide and the cationic polyacrylamide/microcrystalline cellulose blend. Thus, the IPN material is a different product than the cationic polyacrylamide and the cationic polyacrylamide/microcrystalline cellulose blend.

Drainage Test

Drainage was studied by comparing drainage time with different dosages of HM-0 (cationic PAM) and HM-MFC (IPN material according to the present invention.

The cationic PAM was produced with the above described method.

The HM-MFC was produced with the same method as described above, but instead of MCC, MFC was used.

Vacuum drainage test used the treated paper stock poured into Hartley funnel, and the drainage time under vacuum is measured along with the wet weight of the formed pad after drainage and the weight of the dried pad. From the latter two readings a percentage pad solids level is determined. The higher the pad solids the drier the paper sheet will be entering the press section.

As can be seen from the FIG. 1, the HM-MFC (IPN material of the present invention) exhibits improved drainage time with different dosages compared to cationic polyacrylamide (HM-0).

The invention claimed is:

1. An interpenetrating polymer network (IPN) material comprising:
   microfibrillated cellulose (MFC); and
   at least one polymer forming the IPN together with the MFC, wherein said at least one polymer is formed in a polymerization reaction of at least one monomer,
   wherein at least one of said at least one monomer is acrylamide and said at least one monomer comprises at least one cationic monomer,
   wherein the IPN is water-soluble and/or non-crosslinked, and
   wherein an amount of the MFC is 0.5-15 wt. %, based on an amount of the IPN material.

2. The interpenetrating polymer network (IPN) material according to claim 1, wherein the at least one polymer is cationic or anionic.

3. The interpenetrating polymer network (IPN) material according to claim 1, wherein a copolymer of acrylamide and cationic monomer is used, said cationic monomer selected from a group consisting of 2-(acryloyloxy)ethyl]trimethylammonium chloride, (3-acrylamidopropyl)trimethyl ammonium chloride, [2(methacryloyloxy)ethyl]-trimethylammonium chloride, [3-(methacryloylamino)propyl]trimethylammonium chloride, 2-(diethylamino)ethyl acrylate, 2(dimethylamino)ethyl acrylate, a copolymer of acrylamide and cationic monomer selected from a group consisting of 2-(acryloyloxy)ethyl]trimethylammonium chloride, (3acrylamidopropyl)trimethyl ammonium chloride, [2-(methacryloyloxy)ethyl]-trimethylammonium chloride, [3-(methacryoylamino)propyl]trimethylammonium chloride, or a copolymer of acrylamide and [2-(acryloyloxy)ethyl]-trimethyl ammonium chloride.

4. The interpenetrating polymer network (IPN) material according to claim 1, wherein charge density (Mutek) of the IPN material is 1.5-1.1 meq/g, at acidic pH, when measured from 0.5 wt. % aqueous solution.

5. The interpenetrating polymer network (IPN) material according to claim 1, wherein charge density (Mutek) of the IPN material is 1.3-0.1 meq/g, at neutral pH, when measured from 0.5 wt. % aqueous solution.

6. The interpenetrating polymer network (IPN) material according to claim 1, wherein the IPN material is in form of powder.

7. The interpenetrating polymer network (IPN) material according to claim 1, wherein salt viscosity of the IPN material is 100-60 cP, (0.5 wt. % aqueous solution, NaCl 5 wt. %, 18/6 spindle, 30 rpm).

8. A process for producing an interpenetrating polymer network (IPN) material comprising:
   i) providing an aqueous solution comprising microfibrillated cellulose (MFC) and at least one monomer, wherein at least one of said at least one monomer is acrylamide and said at least one monomer comprises at least one cationic monomer;
   ii) polymerizing in situ said at least one monomer to form IPN together with the MFC; and
   iii) obtaining the IPN material,
   wherein the IPN is water-soluble and/or non-crosslinked, and
   wherein an amount of the MFC is 0.5-15 wt. %, based on an amount of the IPN material.

9. The process according to claim 8, wherein the at least one monomer is cationic or anionic monomer.

10. The process according to claim/wherein the at least one monomer is selected from a group consisting of acrylamide, N-methylolacrylamide, N-methylol(meth)acrylamide, N, N-dimethylaminopropylmethacrylamide, N, N-dimethylaminoethylacrylamide, N-[2-(dimethylamino)-1,1-dimethylethyl]acrylamide, cationic monomers selected from a group consisting of 2-(acryloyloxy)ethyl]trimethylammonium chloride, (3-acrylamidopropyl)trimethyl ammonium chloride, [2-(methacryloyloxy)ethyl]-trimethylammoniumchloride, [3(methacryoylamino)propyl]trimethylammonium chloride, 2-(diethylamino)ethyl acrylate, 2-(dimethylamino)ethyl acrylate, anionic monomers selected from a group consisting of acrylic acid, acryloyl chloride, methacrylic acid, 2-acrylamido-2-methylpropane sulfonic acid, sodium 2(acryloylamino)2-methyl-1-propanesulfonate, or mixtures thereof;
   the monomers being acrylamide and cationic monomer selected from a group consisting of 2-(acryloyloxy)ethyl]trimethylammonium chloride, (3 acrylamidopropyl)trimethyl ammonium chloride, [2-(methacryloyloxy)ethyl]-trimethylammonium chloride, [3-(methacryoylamino)propyl]trimethylammonium chloride, or the monomers being acrylamide and [2-(acryloyloxy)ethyl]trimethyl ammonium chloride.

11. The process according to claim 8, wherein pH of the aqueous solution in step i) is set to acidic region.

12. The process according to claim 8, wherein the polymerization of ii) is initiated with one or more initiators selected from a group consisting of 2,2'-azobis(2-methylpropionamidine) dihydrochloride, 2,2'-azobis[2-(2-imidazolin-2-yl)propane]dihydrochloride, 2,2'-azobisisobutyronitrile (AIBN), peroxides, peracids, persulfates such as potassium persulfate and ammonium persulfate, sulfates or mixtures thereof, or ammonium persulfate.

13. The process according to claim 8, wherein the obtained IPN material from iii) is dried.

14. The process according to claim 8, wherein ii) is performed under an inert atmosphere.

15. The process according to claim 8, wherein amount of the MFC is 0.5-15 wt. % based on the amount of the IPN material.

16. A method of producing paper or board, comprising the steps of providing a pulp slurry, adding IPN material according to claim 1 or the IPN material produced by the process according to claim 1 to the pulp slurry, dewatering said pulp slurry on a wire, and forming a paper of said dewatered pulp slurry.

17. A method for improving drainage in production of paper or board, characterized by adding IPN material according to claim 1 or the IPN material produced by the process according to claim 1 to a pulp slurry.

* * * * *